(12) United States Patent
Jansen et al.

(10) Patent No.: US 11,394,072 B2
(45) Date of Patent: Jul. 19, 2022

(54) CELL ASSEMBLY FOR A BATTERY MODULE

(71) Applicant: CLARIOS ADVANCED SOLUTIONS GMBH, Hannover (DE)

(72) Inventors: Marco Jansen, Groß Hehlen (DE); Henning Eisermann, Vetze (DE)

(73) Assignee: CLARIOS ADVANCED SOLUTIONS GMBH, Hannover (DE)

( * ) Notice: Subject to any disclaimer, the term of this patent is extended or adjusted under 35 U.S.C. 154(b) by 130 days.

(21) Appl. No.: 16/304,628

(22) PCT Filed: Jul. 27, 2017

(86) PCT No.: PCT/US2017/044209
§ 371 (c)(1),
(2) Date: Nov. 26, 2018

(87) PCT Pub. No.: WO2018/022907
PCT Pub. Date: Feb. 1, 2018

(65) Prior Publication Data
US 2019/0280265 A1   Sep. 12, 2019

Related U.S. Application Data

(60) Provisional application No. 62/367,548, filed on Jul. 27, 2016.

(51) Int. Cl.
*H01M 10/617* (2014.01)
*H01M 50/20* (2021.01)
(Continued)

(52) U.S. Cl.
CPC ............ *H01M 50/20* (2021.01); *B60L 50/64* (2019.02); *H01M 10/0468* (2013.01);
(Continued)

(58) Field of Classification Search
CPC ............ H01M 2/0257; H01M 2/0275; H01M 2/1077; H01M 10/6555; H01M 10/613;
(Continued)

(56) References Cited

U.S. PATENT DOCUMENTS

2008/0090137 A1  4/2008  Buck et al.
2011/0236739 A1  9/2011  Watanabe et al.
(Continued)

FOREIGN PATENT DOCUMENTS

CN  101953004 A  1/2011
CN  102447085 A  5/2012
(Continued)

OTHER PUBLICATIONS

International Search Report and Written Opinion for PCT/US2017/044209 dated Nov. 15, 2017. 23 pages.

*Primary Examiner* — Milton I Cano
*Assistant Examiner* — Suphia Quraishi
(74) *Attorney, Agent, or Firm* — Christopher & Weisberg, P.A.

(57) ABSTRACT

A lithium ion battery module includes a housing having a thermally conductive base and a cell assembly disposed within the housing and comprising pouch battery cells, a plurality of layers interleaved with the pouch battery cells, and a pair of end plates disposed on opposite ends of the cell assembly to compress the pouch battery cells. The battery cells are held within the cell assembly by cell frames. Each cell frame is formed from two frame pieces. The plurality of layers comprises a plurality of foam sheets and a plurality of thermally conductive sheets. The foam sheets are configured to allow swelling of the pouch battery cells while enabling a substantially constant level of compression of the pouch battery cells by the pair of end plates. The thermally con-
(Continued)

ductive sheets conduct heat from the battery cells toward the thermally conductive base of the housing.

12 Claims, 6 Drawing Sheets (51) Int. Cl.
| | |
|---|---|
| *H01M 10/613* | (2014.01) |
| *H01M 10/625* | (2014.01) |
| *H01M 10/647* | (2014.01) |
| *H01M 10/6555* | (2014.01) |
| *B60L 50/64* | (2019.01) |
| *H01M 10/04* | (2006.01) |
| *H01M 10/42* | (2006.01) |
| *H01M 10/6554* | (2014.01) |
| *H01M 10/0525* | (2010.01) |
| *H01M 50/116* | (2021.01) |

(52) U.S. Cl.
CPC ..... *H01M 10/4207* (2013.01); *H01M 10/613* (2015.04); *H01M 10/617* (2015.04); *H01M 10/625* (2015.04); *H01M 10/647* (2015.04); *H01M 10/6554* (2015.04); *H01M 10/6555* (2015.04); *H01M 10/0525* (2013.01); *H01M 50/116* (2021.01); *H01M 2220/20* (2013.01); *Y02E 60/10* (2013.01); *Y02T 10/70* (2013.01)

(58) Field of Classification Search
CPC ............ H01M 10/617; H01M 10/625; H01M 10/647; H01M 10/6554; H01M 10/0468; H01M 10/4207; H01M 10/0275; H01M 10/0525; H01M 2220/20; Y02E 60/122; Y02T 10/7011; Y02T 10/705
USPC .................................................. 429/120, 155
See application file for complete search history.

(56) References Cited

U.S. PATENT DOCUMENTS

| | | | |
|---|---|---|---|
| 2012/0107664 A1* | 5/2012 | Lee ..................... | H01M 10/658 429/120 |
| 2013/0120910 A1 | 5/2013 | Watanabe | |
| 2013/0171478 A1* | 7/2013 | Ushijima ............ | H01M 2/1016 429/7 |
| 2013/0280590 A1 | 10/2013 | Schaefer et al. | |
| 2014/0050966 A1 | 2/2014 | Merriman et al. | |
| 2014/0154549 A1 | 6/2014 | Wayne et al. | |
| 2016/0049703 A1 | 2/2016 | Lobert et al. | |
| 2016/0093931 A1 | 3/2016 | Rawlinson et al. | |
| 2016/0197373 A1* | 7/2016 | Shaffer, II ......... | H01M 10/6557 429/210 |

FOREIGN PATENT DOCUMENTS

| | | |
|---|---|---|
| CN | 103109395 A | 5/2013 |
| CN | 103168387 A | 6/2013 |
| CN | 104247084 A | 12/2014 |
| CN | 104737327 A | 6/2015 |
| CN | 105609676 A | 5/2016 |
| CN | 205282518 U | 6/2016 |
| WO | 2011013905 A2 | 2/2011 |

* cited by examiner

FIG. 7

CELL ASSEMBLY FOR A BATTERY MODULE

CROSS REFERENCE TO RELATED APPLICATIONS

This application is a U.S. National Stage Application under 35 U.S.C. § 371 of International Application No. PCT/US17/044209 entitled "CELL ASSEMBLY FOR A BATTERY MODULE," filed on Jul. 27, 2017, which claims priority to and the benefit of U.S. Provisional Application Ser. No. 62/367,548, entitled "12V LITHIUM IRON PHOSPHATE BATTERY SYSTEM," filed Jul. 27, 2016, which is hereby incorporated by reference in its entirety for all purposes.

BACKGROUND

The present disclosure relates generally to the field of batteries and battery modules. More specifically, the present disclosure relates to a battery cell assembly that may provide improved compression and/or heat dissipation during operation of the battery module.

This section is intended to introduce the reader to various aspects of art that may be related to various aspects of the present disclosure, which are described below. This discussion is believed to be helpful in providing the reader with background information to facilitate a better understanding of the various aspects of the present disclosure. Accordingly, it should be understood that these statements are to be read in this light, and not as admissions of prior art.

A vehicle that uses one or more battery systems for providing all or a portion of the motive power for the vehicle can be referred to as an xEV, where the term "xEV" is defined herein to include all of the following vehicles, or any variations or combinations thereof, that use electric power for all or a portion of their vehicular motive force. For example, xEVs include electric vehicles (EVs) that utilize electric power for all motive force. As will be appreciated by those skilled in the art, hybrid electric vehicles (HEVs), also considered xEVs, combine an internal combustion engine propulsion system and a battery-powered electric propulsion system, such as 48 Volt (V) or 130V systems.

The term HEV may include any variation of a hybrid electric vehicle. For example, full hybrid systems (FHEVs) may provide motive and other electrical power to the vehicle using one or more electric motors, using only an internal combustion engine, or using both. In contrast, mild hybrid systems (MHEVs) disable the internal combustion engine when the vehicle is idling and utilize a battery system to continue powering the air conditioning unit, radio, or other electronics, as well as to restart the engine when propulsion is desired. The mild hybrid system may also apply some level of power assist, during acceleration for example, to supplement the internal combustion engine. Mild hybrids are typically 96V to 130V and recover braking energy through a belt or crank integrated starter generator.

Further, a micro-hybrid electric vehicle (mHEV) also uses a "Stop-Start" system similar to the mild hybrids, but the micro-hybrid systems of a mHEV may or may not supply power assist to the internal combustion engine and operates at a voltage below 60V. For the purposes of the present discussion, it should be noted that mHEVs typically do not technically use electric power provided directly to the crankshaft or transmission for any portion of the motive force of the vehicle, but an mHEV may still be considered as an xEV since it does use electric power to supplement a vehicle's power needs when the vehicle is idling with internal combustion engine disabled and recovers braking energy through an integrated starter generator.

In addition, a plug-in electric vehicle (PEV) is any vehicle that can be charged from an external source of electricity, such as wall sockets, and the energy stored in the rechargeable battery packs drives or contributes to drive the wheels. PEVs are a subcategory of EVs that include all-electric or battery electric vehicles (BEVs), plug-in hybrid electric vehicles (PHEVs), and electric vehicle conversions of hybrid electric vehicles and conventional internal combustion engine vehicles.

xEVs as described above may provide a number of advantages as compared to more traditional gas-powered vehicles using only internal combustion engines and traditional electrical systems, which are typically 12V systems powered by a lead acid battery. For example, xEVs may produce fewer undesirable emission products and may exhibit greater fuel efficiency as compared to traditional internal combustion vehicles and, in some cases, such xEVs may eliminate the use of gasoline entirely, as is the case of certain types of EVs or PEVs.

As technology continues to evolve, there is a need to provide improved power sources, particularly battery modules, for such vehicles and other implementations. For example, battery cells of a battery module may heat during charging or in operation as electrochemical reactions within the battery cells take place. Further, the battery cells of the battery module may swell based on the state of charge of each battery cell. Charge transfer and performance of battery cells within such battery modules may decrease over time due to unequal temperature and/or unequal pressure between the battery cells of the battery module. This may decrease the performance of the overall battery module.

In view of these and other considerations, it is now recognized that a need exists for an assembly of the battery cells within the battery module that may provide compression and/or thermal conduction mechanisms to enable an equalization of the pressure and temperature between the individual battery cells of the battery module.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The present disclosure relates to a lithium ion battery module, having a housing; and a cell assembly disposed within the housing and including a plurality of pouch battery cells held within the cell assembly by a plurality of cell frames. Each pouch battery cell has a corresponding cell frame, and wherein each cell frame includes a first frame piece positioned on and contacting a first side of a pouch battery cell of the plurality of battery cells and having a first ring; and a second frame piece positioned on and contacting a second side of the pouch battery cell opposite the first side and having a second ring. The first and second rings are positioned above a terminal surface of the pouch battery cell and are disposed directly adjacent to one another to form a portion of an annular passage. A fastener of the cell assembly extends through the annular passage to physically couple the first frame piece and the second frame piece together and thereby form the cell frame.

The present disclosure also relates to a lithium ion battery module, including: a housing comprising a thermally conductive base; a cell assembly disposed within the housing. The cell assembly includes a plurality of battery cells, and each battery cell of the plurality of battery cells includes a body and one or more terminals disposed on a terminal surface of the battery cell; and a plurality of thermally conductive sheets interleaved with the plurality of battery cells. A thermally conductive sheet of the plurality of thermally conductive sheets is disposed between a battery cell of the plurality of battery cells and an adjacent battery cell of the plurality of battery cells. The thermally conductive sheet includes a planar portion disposed between the battery cell and the adjacent cell and a lip portion extending from an end of the planar portion disposed below a surface of the battery cell opposite the terminal surface. A thermal pad is in contact with the conductive base, and the conductive base and the thermal pad are positioned transverse to the battery cells and the thermally conductive sheets. An epoxy layer is disposed between the thermal pad and the cell assembly.

The present disclosure further relates to a lithium ion battery module, including a housing having a thermally conductive base. A cell assembly disposed within the housing and includes a plurality of pouch battery cells, a plurality of layers interleaved with the plurality of pouch battery cells, and a pair of end plates disposed on opposite ends of the cell assembly to compress the plurality of pouch battery cells and the plurality of layers together. The plurality of battery cells is held within the cell assembly by a plurality of cell frames. Each pouch battery cell has a corresponding cell frame formed from two frame pieces fastened to one another at a single point above a terminal surface of the pouch battery cell. The plurality of layers includes a plurality of foam sheets and a plurality of thermally conductive sheets. The plurality of foam sheets is configured to allow swelling of the plurality of pouch battery cells while enabling a substantially constant level of compression of the pouch battery cells by the pair of end plates. The plurality of thermally conductive sheets is configured to conduct heat from the plurality of battery cells and toward the thermally conductive base of the housing.

DRAWINGS

Various aspects of this disclosure may be better understood upon reading the following detailed description and upon reference to the drawings in which.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The battery systems described herein may be used to provide power to various types of electric vehicles (xEVs) and other high voltage energy storage/expending applications (e.g., electrical grid power storage systems). Such battery systems may include one or more battery modules, each battery module having a housing and a number of battery cells (e.g., lithium-ion (Li-ion) electrochemical cells) arranged within the housing to provide particular voltages and/or currents useful to power, for example, one or more components of an xEV. As another example, battery modules in accordance with present embodiments may be incorporated with or provide power to stationary power systems (e.g., non-automotive systems).

Based on the advantages over traditional gas-power vehicles, manufactures that generally produce traditional gas-powered vehicles may desire to utilize improved vehicle technologies (e.g., regenerative braking technology) within their vehicle lines. Often, these manufactures may utilize one of their traditional vehicle platforms as a starting point. Accordingly, since traditional gas-powered vehicles are designed to utilize 12 V battery systems, a 12 V lithium ion battery may be used to supplement a 12 V lead-acid battery. More specifically, the 12 V lithium ion battery may be used to more efficiently capture electrical energy generated during regenerative braking and subsequently supply electrical energy to power the vehicle's electrical system. Additionally, in a mHEV, the internal combustion engine may be disabled when the vehicle is idle. Accordingly, the 12 V lithium ion battery may be used to crank (e.g., restart) the internal combustion engine when propulsion is desired.

However, as advancements are made in vehicle technologies, high voltage electrical devices may be included in the vehicle's electrical system. For example, the lithium ion battery may supply electrical energy to an electric motor in a FHEV. Often, these high voltage electrical devices utilize voltages greater than 12 V, for example, up to 48, 96, or 130 V. Accordingly, in some embodiments, the output voltage of a 12 V lithium ion battery may be boosted using a DC-DC converter to supply power to the high voltage devices. Additionally or alternatively, a 48 V lithium ion battery may be used to supplement a 12 volt lead-acid battery. More specifically, the 48 V lithium ion battery may be used to more efficiently capture electrical energy generated during regenerative braking and subsequently supply electrical energy to power the high voltage devices.

As set forth above, temperature and pressure or compression of the battery cells of a battery module may vary during charging and operation of the battery module, and may be unequal between the battery cells. Unequal temperature and pressure between the battery cells of the battery module may hinder charge transfer within the battery cells, and thus, performance of the battery cells and the overall battery module. Generally, the disclosed embodiments are directed toward a battery cell assembly that may enable conduction of heat away from the battery cells to equalize the temperature between the battery cells and compression of the battery cells to apply a defined and equalized pressure between the battery cells. The battery cell assembly may enable an increase in the performance of the battery cells and the overall battery module.

Figure 1:
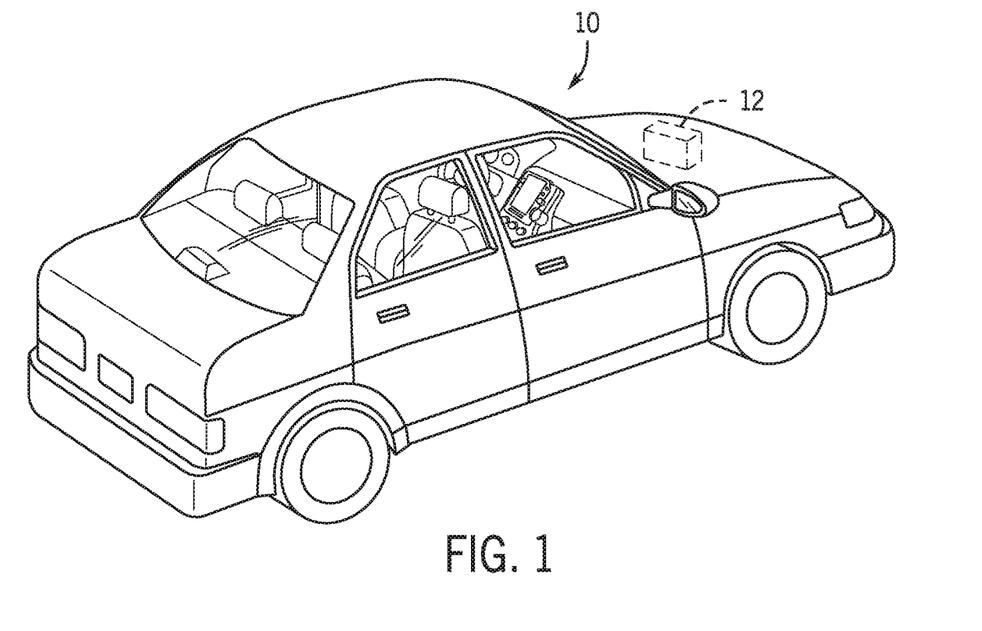
FIG. 1 is a perspective view of an xEV having a battery system configured in accordance with present embodiments to provide power for various components of the xEV, in accordance with an aspect of the present disclosure.

With the foregoing in mind, present embodiments relate to a cell assembly that may be applied to any battery or battery system, in particular battery systems employed in an xEV. For example, FIG. 1 is a perspective view of an embodiment of a vehicle 10, which may utilize a regenerative braking system. Although the following discussion is presented in relation to vehicles with regenerative braking systems, the techniques described herein are adaptable to other vehicles that capture/store electrical energy with a battery, which may include electric-powered and gas-powered vehicles.

It is now recognized that it is desirable for a non-traditional battery system 12 (e.g., a lithium ion car battery) to be largely compatible with traditional vehicle designs. In this respect, present embodiments include various types of battery modules for xEVs and systems that include xEVs. Accordingly, the battery system 12 may be placed in a location in the vehicle 10 that would have housed a traditional battery system. For example, as illustrated, the vehicle 10 may include the battery system 12 positioned similarly to a lead-acid battery of a typical combustion-engine vehicle (e.g., under the hood of the vehicle 10). Furthermore, as will be described in more detail below, the battery system 12 may be positioned to facilitate managing temperature of the battery system 12. For example, in some embodiments, positioning a battery system 12 under the hood of the vehicle 10 may enable an air duct to channel airflow over the battery system 12 and cool the battery system 12.

Figure 2:
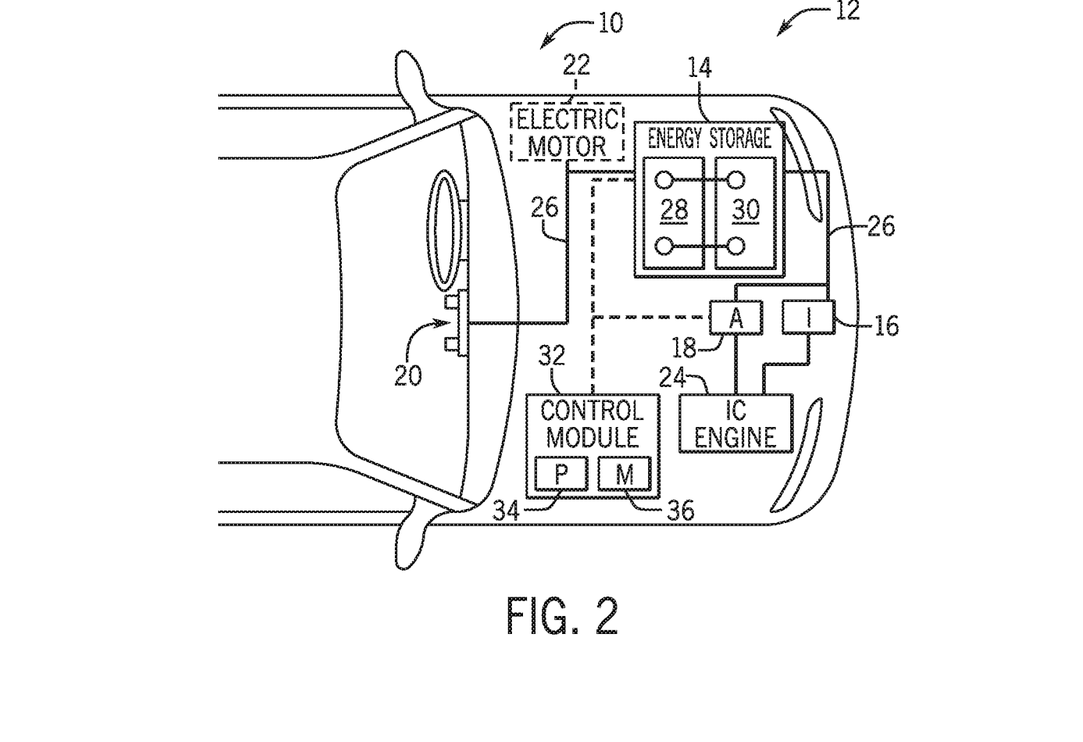
FIG. 2 is a cutaway schematic view of an embodiment of the xEV having a start-stop system that utilizes the battery system of FIG. 1, the battery system having a lithium ion battery module, in accordance with an aspect of the present disclosure.

A more detailed view of the battery system 12 is described in FIG. 2. As depicted, the battery system 12 includes an energy storage component 14 coupled to an ignition system 16, an alternator 18, a vehicle console 20, and optionally to an electric motor 22. Generally, the energy storage component 14 may capture/store electrical energy generated in the vehicle 10 and output electrical energy to power electrical devices in the vehicle 10.

In other words, the battery system 12 may supply power to components of the vehicle's electrical system, which may include radiator cooling fans, climate control systems, electric power steering systems, active suspension systems, auto park systems, electric oil pumps, electric super/turbochargers, electric water pumps, heated windscreen/defrosters, window lift motors, vanity lights, tire pressure monitoring systems, sunroof motor controls, power seats, alarm systems, infotainment systems, navigation features, lane departure warning systems, electric parking brakes, external lights, or any combination thereof. Illustratively, in the depicted embodiment, the energy storage component 14 supplies power to the vehicle console 20 and the ignition system 16, which may be used to start (e.g., crank) the internal combustion engine 24.

Additionally, the energy storage component 14 may capture electrical energy generated by the alternator 18 and/or the electric motor 22. In some embodiments, the alternator 18 may generate electrical energy while the internal combustion engine 24 is running. More specifically, the alternator 18 may convert the mechanical energy produced by the rotation of the internal combustion engine 24 into electrical energy. Additionally or alternatively, when the vehicle 10 includes an electric motor 22, the electric motor 22 may generate electrical energy by converting mechanical energy produced by the movement of the vehicle 10 (e.g., rotation of the wheels) into electrical energy. Thus, in some embodiments, the energy storage component 14 may capture electrical energy generated by the alternator 18 and/or the electric motor 22 during regenerative braking. As such, the alternator and/or the electric motor 22 are generally referred to herein as a regenerative braking system.

To facilitate capturing and supplying electric energy, the energy storage component 14 may be electrically coupled to the vehicle's electric system via a bus 26. For example, the bus 26 may enable the energy storage component 14 to receive electrical energy generated by the alternator 18 and/or the electric motor 22. Additionally, the bus may enable the energy storage component 14 to output electrical energy to the ignition system 16 and/or the vehicle console 20. Accordingly, when a 12 volt battery system 12 is used, the bus 26 may carry electrical power typically between 8-18 volts.

Additionally, as depicted, the energy storage component 14 may include multiple battery modules. For example, in the depicted embodiment, the energy storage component 14 includes a lithium ion (e.g., a first) battery module 28 and a lead-acid (e.g., a second) battery module 30, which each includes one or more battery cells. In other embodiments, the energy storage component 14 may include any number of battery modules. Additionally, although the lithium ion battery module 28 and lead-acid battery module 30 are depicted adjacent to one another, they may be positioned in different areas around the vehicle. For example, the lead-acid battery module may be positioned in or about the interior of the vehicle 10 while the lithium ion battery module 28 may be positioned under the hood of the vehicle 10.

In some embodiments, the energy storage component 14 may include multiple battery modules to utilize multiple different battery chemistries. For example, when the lithium ion battery module 28 is used, performance of the battery system 12 may be improved since the lithium ion battery chemistry generally has a higher coulombic efficiency and/or a higher power charge acceptance rate (e.g., higher maximum charge current or charge voltage) than the lead-acid battery chemistry. As such, the capture, storage, and/or distribution efficiency of the battery system 12 may be improved.

To facilitate controlling the capturing and storing of electrical energy, the battery system 12 may additionally include a control module 32. More specifically, the control module 32 may control operations of components in the battery system 12, such as relays (e.g., switches) within energy storage component 14, the alternator 18, and/or the electric motor 22. For example, the control module 32 may regulate amount of electrical energy captured/supplied by each battery module 28 or 30 (e.g., to de-rate and re-rate the battery system 12), perform load balancing between the battery modules 28 and 30, determine a state of charge of each battery module 28 or 30, determine temperature of each battery module 28 or 30, control voltage output by the alternator 18 and/or the electric motor 22, and the like.

Accordingly, the control unit 32 may include one or processor 34 and one or more memory 36. More specifically, the one or more processor 34 may include one or more application specific integrated circuits (ASICs), one or more field programmable gate arrays (FPGAs), one or more general purpose processors, or any combination thereof. Additionally, the one or more memory 36 may include volatile memory, such as random access memory (RAM), and/or non-volatile memory, such as read-only memory (ROM), optical drives, hard disc drives, or solid-state drives. In some embodiments, the control unit 32 may include portions of a vehicle control unit (VCU) and/or a separate battery control module. Furthermore, as depicted, the lithium ion battery module 28 and the lead-acid battery module 30 are connected in parallel across their terminals. In other words, the lithium ion battery module 28 and the lead-acid module 30 may be coupled in parallel to the vehicle's electrical system via the bus 26.

Figure 3:
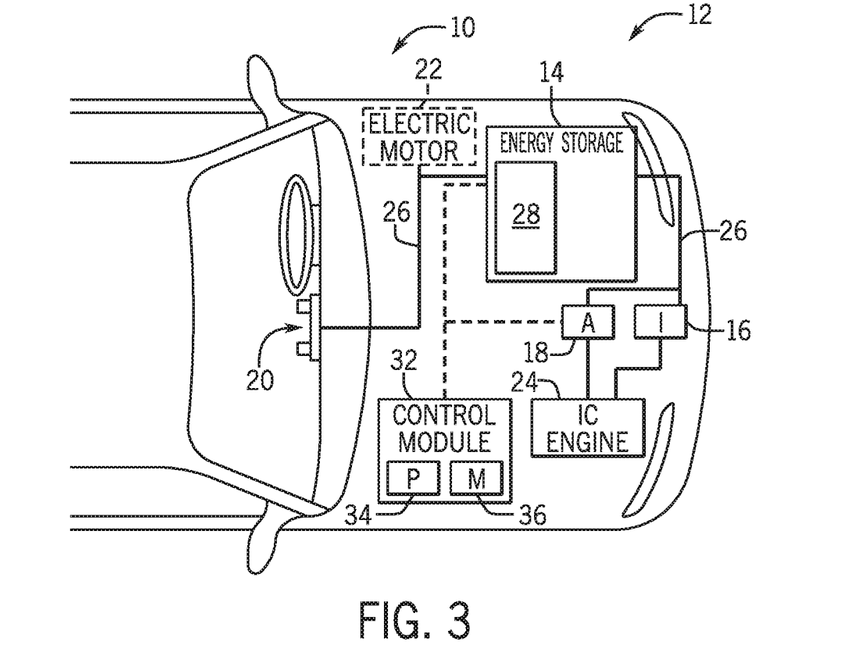
FIG. 3 is a cutaway schematic view of an embodiment of the xEV having a start-stop system that utilizes the battery system of FIG. 1, the battery system using a lithium ion battery module or a starter battery, in accordance with an aspect of the present disclosure.

In certain embodiments, the battery system 12 may include only the lithium ion battery module 28 as a starter battery for the vehicle 10, as illustrated in FIG. 3. In such embodiments, the lithium ion battery module 28 may include structural elements to accommodate form factors of a standard lead-acid battery. As such, the outside dimensions of the lithium ion battery module 28 may fit within a receptacle configured to hold a traditional lead acid battery having a standard size. In addition, the lithium ion battery module 28 may have appropriate electrical characteristics (e.g., discharge capability, capacity) that allow it to function as a suitable starter battery.

Figure 4:
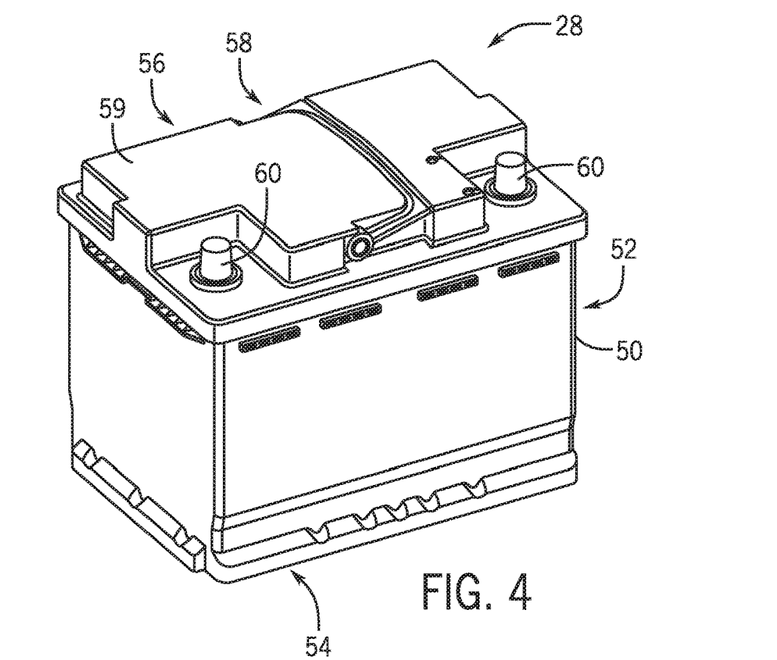
FIG. 4 is a perspective view of an embodiment of the lithium ion battery module of the battery system of FIGS. 2 and 3, in accordance with an aspect of the present disclosure.

FIG. 4 illustrates an embodiment of the battery module 28 (e.g., lithium ion battery module). As mentioned above, the size and shape of the battery module 28 may be similar to or the same size and shape as a typical lead-acid battery. The battery module 28 may conform to any of various lead acid dimensional standards. Further, certain industrial standards have been developed for use in configuring the physical packaging of lead acid batteries. For example, the Battery Council International (BCI) is a trade association that sets certain standards for vehicle batteries. A number of battery groups and sizes have been specified by the BCI. The battery module 28 may conform to a standardized lead-acid battery group designation of those specified by the BCI. The battery module 28 may include a battery cell assembly (shown in FIG. 5) having a plurality of battery cells positioned within a housing 50 of the battery module 28. The housing 50 may include a plurality of sides 52 and a base 54. The housing 50 may conform to standardized dimensions for lead-acid batteries (e.g., may have a BCI group number designation). The battery module 28 may further include a lid assembly 56 disposed on a terminal side 58 of the battery module 28. The lid assembly 56 may include a casing 59 surrounding components of lid assembly 56, as discussed in greater detail with reference to FIG. 5.

In some embodiments, the sides 52 of the housing 50 and the casing 57 of the lid assembly 56 may be made of a plastic or any other non-conductive material. In some embodiments, the base 54 of the housing 50 may be made of or include a metal or other thermally conductive material that may enable transfer of heat from within the battery module 28 to an adjacent material or to the ambient air. Together, the housing 50, including the sides 52 and the base 54, and the lid assembly 56 may enclose the battery cell assembly within the battery module 28. The battery module 28 may include one or more terminals 60 disposed on the terminal side 58 of the battery module 28. The terminals 60 of the battery module 28 may be electrically connected to the terminals of the plurality of battery cells within the battery module 28, thereby serving as an interface to connect a load (e.g., components of the vehicle 10) to the battery cells.

Figure 5:
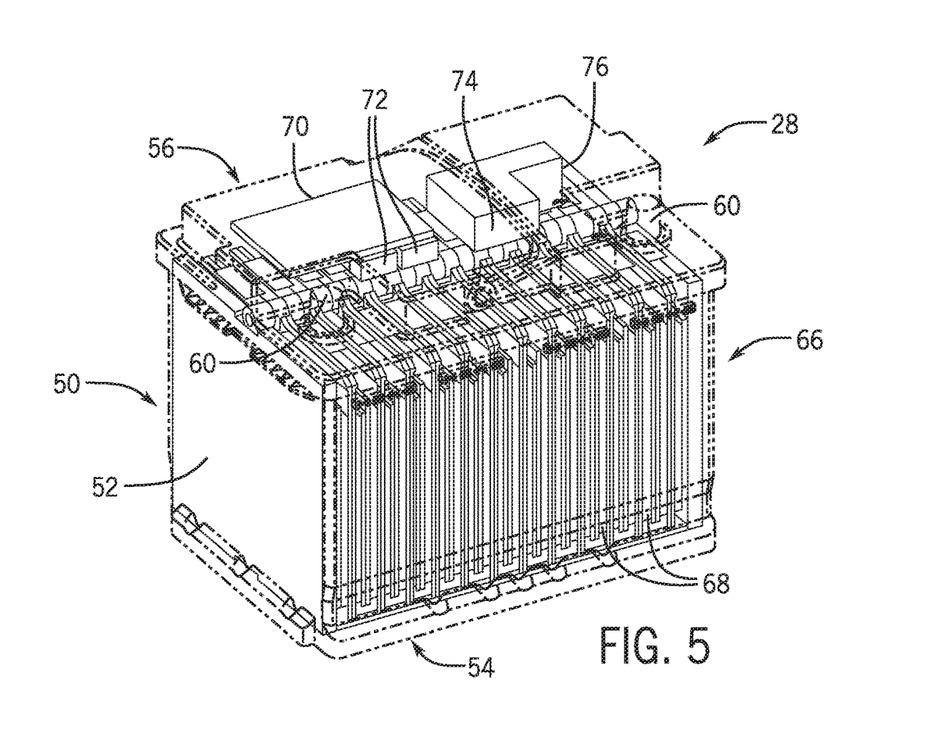
FIG. 5 is a cutaway perspective view of various internal components of the battery module of FIG. 4, in accordance with an aspect of the present disclosure.

FIG. 5 illustrates a cutaway view of an embodiment of the battery module 28 showing the enclosed battery cells and various components of the battery module 28 disposed within the lid assembly 56. As previously discussed, the housing 50 and the lid assembly 56 of the battery module 28 may enclose a cell assembly 66 including multiple battery cells 68. There may be any number of battery cells 68 within the battery module 28, and the battery cells 68 may be oriented parallel to one another within the battery module 28. While the battery cells 68 are illustrated as oriented transverse (e.g., perpendicular) to the base 54 of the battery module 28, other configurations if the battery cells 68 may be used, such as in an orientation parallel to the base 54. However, the battery cells 68 will generally be provided in an amount and configuration so as to have a sufficient energy density, voltage, current, capacity, and so forth, for a particular application. The battery cells 68 may be electrically connected to each other and to the terminals 60 of the battery module 28, which may be electrically connected to one or more components of the vehicle 10. In some embodiments, two or more of the battery cells 68 may be electrically connected in parallel to form a string (e.g., group) and the strings may be connected in series.

In some embodiments, the lid assembly 56 may include a printed circuit board (PCB) 70 of the battery module 28. The PCB 70 may include a controller (e.g., the control module 32 of FIG. 2), including a memory (e.g., memory 36) and a processor (e.g., processor 34), of the battery module 28 and one or more internal signal connectors 72. The internal signal connectors 72 are configured to connect the controller module 32 of the battery module 28 to one or more sensors of the battery module 28 used to measure temperature and/or voltage. The control module 32 may also communicate with the vehicle 10 (e.g., via the vehicle control unit). The lid assembly 56 may also include a relay 74. The relay 74 may include a switch control that can be energized and deenergized to cause a switch to move between an open and a closed position to connect or disconnect, respectively, the battery module 28 as a whole, or particular groups of the battery cells 68, to components of the vehicle 10 via the bus 26. The lid assembly 56 may also include a vehicle signal connector 76 that may enable the battery module 28 to receive signals from and output signals to the vehicle 10.

Figure 6:
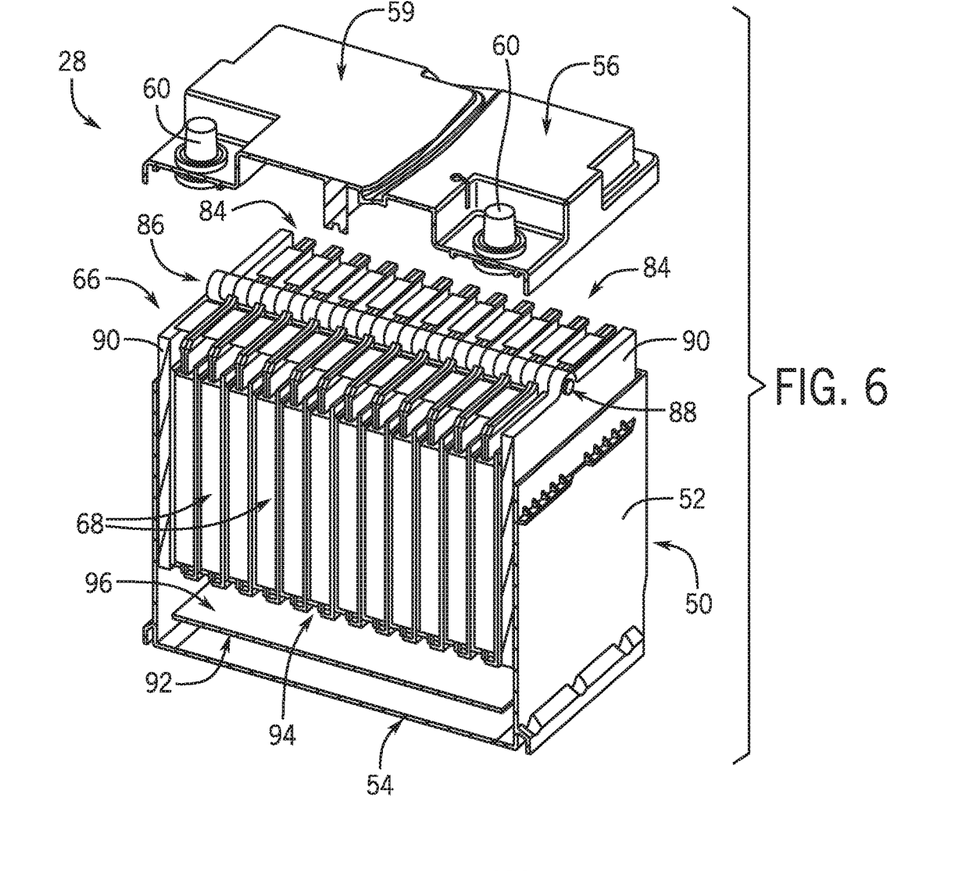
FIG. 6 is an exploded view of the battery module of FIG. 4, illustrating an example of a battery cell assembly, in accordance with an aspect of the present disclosure.

To illustrate an example arrangement of the battery cell assembly 66 within the housing 50 and the casing 59 of the lid assembly 56, FIG. 6 is an exploded view of the battery module 28 with one of the sides 52 of the housing 50 removed for clarity. As previously discussed, the housing 50 includes the sides 52 and the base 54, which define a space in which the battery cell assembly 66 is positioned. In some embodiments, the battery cell assembly 66 may entirely fill the space within the housing 50. In some embodiments, the battery cells of the battery cell assembly 66 may be pouch cells that may be flexible in nature. The flexible nature of the pouch cells may enable the battery cells 68 to be compressed by the housing 50 and other components of the battery cell assembly 66, as discussed in greater detail with respect to FIG. 8. To provide for stable and predictable operation of the battery module 28, the battery cells 68 may be compressed together to fit within and fill the space in the housing 50.

The battery cell assembly 66 may include equalization assemblies 84 associated with each battery cell 68 of the battery cell assembly 66. The equalization assemblies 84 may enable equalization of pressure and/or temperature between the battery cells 68, as discussed in greater detail with reference to FIGS. 8 and 9. The battery cell assembly 66 may be held together via frames (e.g., a first frame piece and a second frame piece) that hold the individual battery cells 68 and form a passage 86 along a terminal side of the battery cells 68. A fastener 88 (e.g., a screw or other fastener), may fit within the passage 86 to hold the battery cell assembly 66 together. Further, because the fastener 88 includes threads, progressive tightening of the fastener 88 provides increased compression to the battery cells 68, as discussed herein. In some embodiments, the battery cell assembly 66 may include end plates 90 (e.g., a pair of end plates, including first and second end plates) that may be disposed at either end of the battery cell assembly 66, with the battery cells 68 (and other layers of the cell assembly 66) positioned in between the end plates 90. Note that, the fastener 88, when turned, causes the end plates 90 to move toward one another and thereby compress the battery cells 68.

As previously discussed, the base 54 of the housing 50 may include a thermally conductive plate (e.g., an overmolded metal plate) exposed to the outside of the battery module 28. Accordingly, at least a portion of the base 54 may serve as a cooling plate that facilitates heat rejection to the ambient or surrounding environment. For example, the base 54 may conduct heat away from the battery cell assembly 68 during charging or operation of the battery cells 68.

In some embodiments, the battery module 28 may include a thermal pad 92 to facilitate heat transfer from the battery cells 68 to the base 54, and out of the battery module 28. The thermal pad 92 may be disposed adjacent to (e.g., in contact with) the base 54 to facilitate heat transfer between the thermal pad 92 and the base 54. As an example, the thermal pad 92 may be positioned between the base 54 and a bottom surface 94 of the battery cell assembly 66 and may be in contact with a portion of the equalization assemblies 84 (e.g., a thermal plate) to facilitate heat transfer from the battery cells 68 to the thermal pad 92.

To provide for additional heat transfer and fixation of the battery cell assembly 68 in the battery module 28, the battery module 28 may include an epoxy layer 96 (e.g., adhesive layer) disposed within the housing 50 between the thermal pad 92 and the bottom surface 94 of the battery cell assembly 66. The epoxy layer 96 may be in contact with the thermal pad 92 and a portion of the equalization assemblies 84 associated with the battery cells 68 of the battery cell assembly 66 and may help maintain contact between a portion of the equalization assemblies 84 and the thermal pad 92 to facilitate heat transfer. Further, the epoxy layer 96 may be utilized to secure the cell assembly 66 within the housing 50, and to facilitate temperature equilibration between the battery cells 68.

Figure 7:
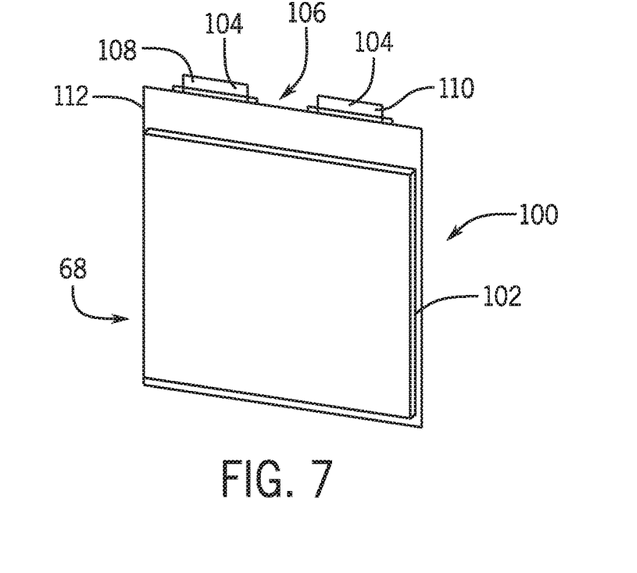
FIG. 7 is a perspective view of an embodiment of a pouch battery cell used in the battery module of FIG. 6, in accordance with an aspect of the present disclosure.

FIG. 7 illustrates an embodiment of the battery cell 68 that may be included in the battery cell assembly 66 of the battery module 28. As previously discussed, the battery cell assembly 66 may include a plurality of the battery cells 68 arranged within the housing 50. The battery cells 68 may be any lithium ion electrochemical cell, including any appropriate positive active material chemistry, such as lithium iron phosphate, lithium nickel magnesium cobalt oxide, lithium titanate, lithium nickel cobalt aluminum oxide, lithium cobalt oxide, or lithium metal oxide spinel. The battery cell 68 may have a polymer packaging 100 that may enclose the internal components (including an electrode stack and an electrolyte) within a body 102 of the battery cell 68. The polymer packaging 100 of the battery cell 68 may a flexible packaging. Thus, surrounding structure provided by the equalization assemblies 84, as discussed in greater detail with reference to FIGS. 8 and 9, and the housing 50 may enable substantially consistent pressure applied to the battery cells 68 within the battery module 28.

The electrode stack within the body 102 of the battery cell 68 may include a cathode layer and an anode layer, with a separator layer in between the cathode layer and the anode layer. The cathode layer, the separator layer, and the anode layer may be wound together within the body 102 of the battery cell 68. While, the cathode layer and the anode layer may not be touching, an electrolyte may pass between the cathode layer and the anode layer via the separator layer. The surrounding structure and pressure provided by the equalization assemblies 84, and the housing 50 may enable equalized compression on and maintenance of the contact between the layers of the electrode stack within the battery cells 68. In this way, even during times when the battery cells 68 swell during use, a sufficient level of compression is applied to prevent delamination of the cathode, anode, and separator layers of the battery cells 68. Further, this applied compression is substantially consistent across all of the battery cells 68 of the battery cell assembly 66. Accordingly, the equalization assemblies 84 encourage the battery cells 68 of the battery cell assembly 66 to have similar behavior during use.

As shown in the illustrated embodiment, the battery cell 68 includes two terminals 104 extending from the body 102 of the battery cell 68. The terminals 104 may be terminal flags, as shown in the illustrated embodiment, and as such, the terminals 104 may be flexible. In the illustrated embodiment, the terminals 104 both extend from a terminal surface 106 of the battery cell 68. However, in other embodiments, the terminals 104 may extend from opposite ends of the battery cell 68. The terminals 104 may include a positive terminal 108 and a negative terminal 110. The positive terminal 108 may be electrically coupled to the cathode layer, and the negative terminal 110 may be electrically coupled to the anode layer within the packaging 100 of the battery cell 68. In some embodiments, the packaging 100 of the battery cell 68 may include a ridge 112 that may extend from the body 102 between the body 102 and the terminal surface 106. The ridge 112 may enable a frame of the equalization assembly 84 to fit around the body 102 of the battery cell 68, while still enabling extension of the terminals 104 outside of the equalization assemblies 84 for electrical coupling, as discussed in greater detail with reference to FIGS. 8 and 9.

Figure 8:
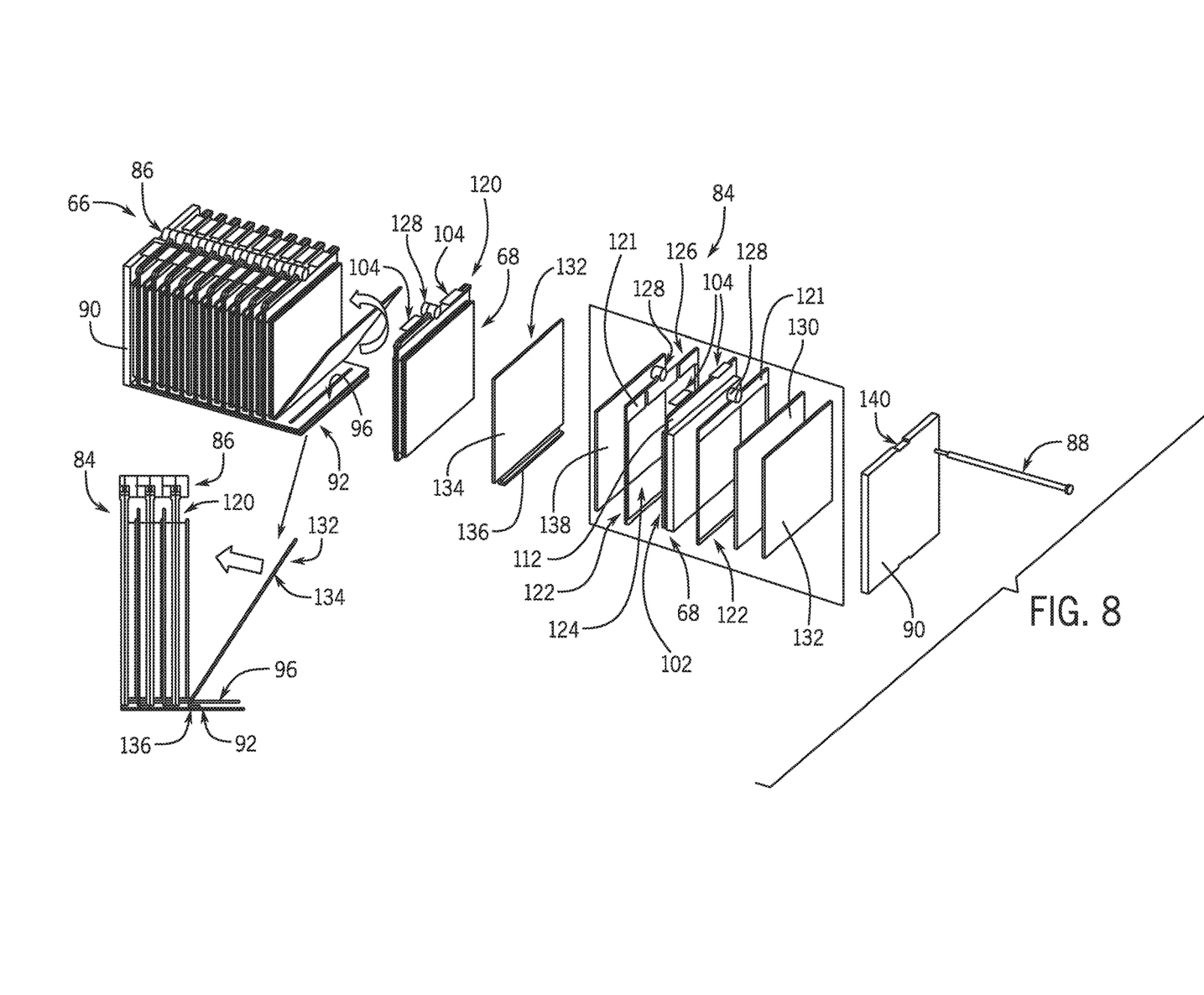
FIG. 8 is an exploded view of the battery cell assembly of FIG. 6, in accordance with an aspect of the present disclosure.

To illustrate the layers that may form the battery cell assembly 66, FIG. 8 is an exploded view of an embodiment of the battery cell assembly 66 showing the arrangement of battery cells 68 and equalization assemblies 84 (e.g., including a plurality of layers interleaved with the battery cells 68)

of the battery cell assembly 66. As previously discussed, the battery cell assembly 66 may include a plurality of the battery cells 68 and a plurality of the equalization assemblies 84, each equalization assembly 84 being associated with a respective battery cell 68. The equalization assemblies 84 may enable equalization of pressure and/or temperature between the battery cells 68 of the battery cell assembly 66 to maintain the performance of the battery cells 68 and the battery module 28. As such, the equalization assembly 84 may act as a compression assembly and/or as a thermal conduction assembly.

Each battery cell 68 of the battery cell assembly 66 may be associated with one of the plurality of equalization assemblies 84. As previously mentioned, the battery cells 68 and associated equalization assemblies 84 may be arranged parallel to one another and oriented such that the battery cells 68 are arranged perpendicular to the base 54 and the thermal pad 92. As such, the terminals 104 of the battery cells 68 may be disposed on the end of the battery cell 68 oriented away from the base 54 and the thermal pad 92. Further as previously discussed, the battery cells 68 and the associated equalization assemblies 84 may be held together via the fastener 88 which may fit inside the passage 86 formed by a portion of the equalization assembly 84.

To provide structured stability for the pouch battery cells 68, the equalization assembly 84 may include a frame unit or cell frame 120 made up of two frame pieces 121. The cell frame 120 may be disposed around the body 102 of the battery cell 68 to hold the battery cell 68 in the battery cell assembly 66. The frame pieces 121 may each include a rigid perimeter 122 surrounding a hollow interior region 124. The hollow interior region 124 may be approximately the same size as the body 102 of the battery cell 68, such that the perimeter 122 of one of the frame pieces 121 may fit around one side of the body 102 of the battery cell 68. In this manner, a first frame piece 121 of the cell frame 120 may fit around one side of the body 120 of the battery cell 68, and a second frame piece 121 of the cell frame 120 may fit around the opposite side of the battery cell 68. The frame pieces 121 of the cell frame 120 may couple around the outside of the battery cell 68, for example at a single point above the terminal side or terminal surface of the battery cell 68. An upper perimeter portion 126 of each of the frame pieces 121 may have a larger (e.g., thicker relative to the rest of the perimeter 122 of the frame pieces 121) perimeter area, as the upper perimeter portion 126 may cover the ridge 112 of the battery cell 68. The frame pieces 121 may fit together around the battery cell 68 via a snap closure or other closure mechanism. The frame pieces 121 may each include a ring 128 (e.g., earhole) extending from the upper perimeter portion 126. As illustrated, the rings 128 of the frame pieces 121 may have an annular structure that contact each other when the frame pieces 121 are fit and closed around the battery cells 68 as the cell frame 120. The rings 128 of each cell frame 120 of the equalization assembly 84 may contact each other and form the passage 86 for the fastener 88 as a continuous structure when the battery cell assembly 66 is formed. Thus, the rings 128 of the cell frames 120 and the passage 86 may hold the battery cell assembly 66 together and provide a defined distance between the battery cells 68 and the other components of the battery cell assembly 66. This defined distance may be controlled by tightening of the fastener 88 into the end plates 90 to thereby control compression of the battery cells 68. For instance, the first and second end plates 90 may each include an end plate ring configured to form end portions of the annular passage 86. The fastener 88 is configured to be threaded into one of the end plate rings to provide progressively increasing amounts of compression to the battery cell assembly 66 by causing the first and second end plates 90 to move inwardly toward one another. Further, the first and second rings of the plurality of cell frames 120 and the end plate rings of the first and second end plates defines a total length dimension for the annular passage, the total length dimension corresponding to a predetermined compression level for the cell assembly.

To provide for additional control over the compression of the battery cells 68, the equalization assembly 84 may include one or more foam sheets 130 disposed on either side or both sides of each battery cell 68. For example, one of the foam sheets 130 may be adjacent to the battery cell 68 such that it contacts the body 102 of the battery cell 68 and such that it contacts the cell frame 120. The foam sheet 130 is configured to allow swelling of the battery cell 68 during operation, while also allowing a substantially constant level of compression to be maintained on the battery cell 68. When the battery cell 68 is in a higher state of charge, the battery cell 68 may swell, and when the battery cell 68 is in a lower state of charge, the battery cell 68 may be thinner. The material of the foam sheet 130 may enable swelling and deswelling of the battery cell 68 while maintaining a particular pressure or compression on the battery cell 68 provided by the cell frame 120 and/or the connection of the cell frames 120 via the rings 128 and the fastener 88.

To facilitate passive cooling of the battery cell 68, the equalization assembly 84 may include a thermally conductive sheet 132. In some embodiments, the conductive sheet 132 may be positioned adjacent to the battery cell 68 and/or the foam sheet 130. The conductive sheet 132 may be made of a metal or other thermally conductive material that may enable transfer of heat away from the battery cells 68. As illustrated, the conductive sheet 132 may have an L-shaped or similarly shaped structure. In this manner, the conductive sheet 132 may include a larger planar portion 134 oriented parallel to the body 102 of the battery cell 68 and may contact the battery cell 68 and/or the foam sheet 130. The conductive sheet 132 may also include a smaller lip portion 136 (e.g., extension portion) extending from the bottom of the larger planar portion 134. The lip portion 136 of the conductive sheet 132 may extend below the battery cell 68 and the cell frame 120, which enables the lip portion 136 to be disposed within the epoxy layer 96. The lip portion 136 may also contact the thermal pad 92 below the epoxy layer 96 to enable heat conduction or transfer from the conductive sheet 132 to the thermal pad 92. To maintain a position of the conductive sheet 132 relative to the battery cell 68 and/or the foam sheet 130, the equalization assembly 84 may include an adhesive layer 138 that may be disposed adjacent to the battery cell 68, the foam sheet 130, or the conductive sheet 132.

In accordance with present embodiments, each battery cell 68 of the battery cell assembly 66 may be associated with any or all of the components of the equalization assembly 84 described above. The plurality of battery cells 68 and the associated equalization assemblies 84 may be positioned adjacent to one another and may be held together via the fastener 88 that may be disposed within the passage 86 formed from the rings 128 of the frame pieces 121 to form the battery cell assembly 66. In some embodiments, the equalization assembly 84 may include only the components that may enable compression and equalization of the pressure between the battery cells 68 of the battery cell assembly 66, such as the frame pieces 121 having the rings 128, the foam sheet 130, the end plates 90, and the fastener 88. In some embodiments, the equalization assembly 84 may include only the components that may enable equalization of the temperature between the battery cells 68 of the battery cell assembly 66, such as the conductive sheet 132. However, the equalization assembly 84 may include any or all of the components to enable an equalization of the pressure and/or the temperature between the battery cells 68 of the battery cell assembly 66. The thermally conductive components of the equalization assembly 84, such as the conductive sheet 132, may be employed in the battery module 28 with the thermal pad 92 and/or the epoxy layer 96 to facilitate the transfer of heat from the battery cells 68 to the ambient environment via the base 54.

To maintain a defined compression consistent between the battery cells 68, the battery cell assembly 66 may include the end plates 90 disposed at either end or both ends of the battery cell assembly 66. The end plates 90 may each have a ring 140 disposed at a top end. The end plate 90 may be disposed adjacent to or in contact with one of the battery cells 68 or a component of the equalization assembly 84 at each end of the battery cell assembly 66. The rings 140 of the end plates 90 may have an annular structure and may form part of the passage 86 through which the fastener 88 is disposed. However, in some embodiments, the ring 140 of one of the end plates 90 may have an annular structure containing threads, while the ring 140 of the other end plate 90 may not have an annular structure. As such, the end plates 90 may hold together the battery cell assembly 66, may help provide equalized compression on each of the battery cells 68 of the battery cell assembly 66, and may help the battery cell assembly 66 fit securely within the housing 50 of the battery module 28.

Figure 9:
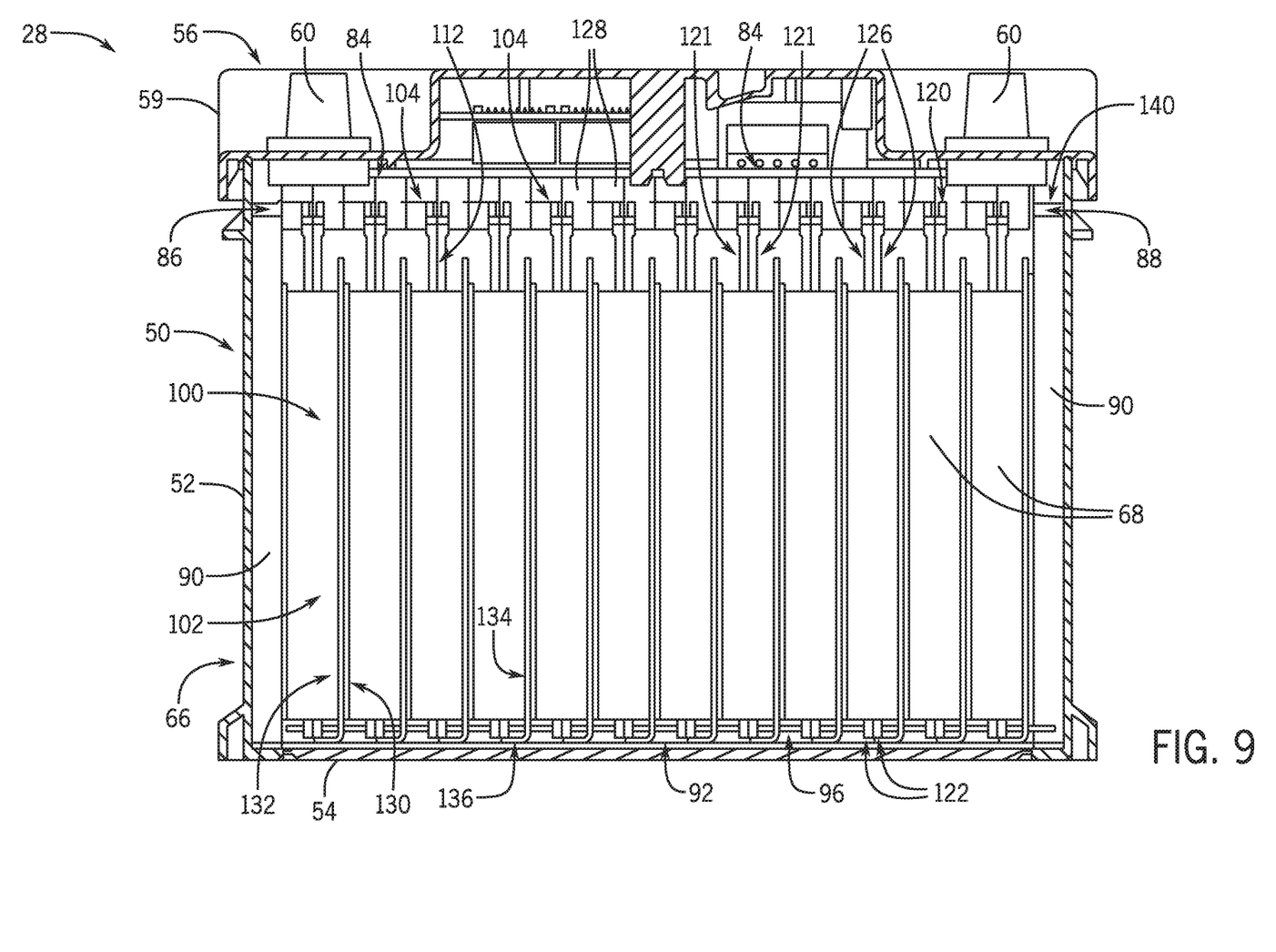
FIG. 9 is a cutaway front elevation view of an embodiment of the battery module of FIG. 4 having the battery cell assembly of FIG. 8, in accordance with an aspect of the present disclosure.

FIG. 9 illustrates a cutaway view of the battery module 28 showing the manner in which the battery cell assembly 66 is integrated with certain other components within the battery module 28. In the illustrated embodiment, the battery cell assembly 66 includes twelve battery cells 68 and twelve equalization assemblies 84 associated with the battery cells 68. However, any number of battery cells 68 may be provided so as to have a sufficient energy density, voltage, current, capacity, and so forth, for a particular application. The battery cells 68 may be electrically connected in multiple groups, or in other configurations, through the terminals 104 and electrically connected to the terminals 60 of the battery module 28 to connect to the vehicle 10.

The equalization assemblies 84 each associated with a respective battery cell 68 may enable equal pressure, or compression, between the battery cells 68 and may enable increased performance of the battery cells 68 and the battery module 28. The frame pieces 121 of the frame unites 120 positioned around the battery cells 68 may contact each other medially above the ridge 112 of the packaging 100 of the battery cell 68. The coupled rings 128 of the frame pieces 121 of each equalization assembly 84 form the annular passage 86 through which the fastener 88 is disposed to couple the rings 128 of the frame pieces 121 and hold the battery cell assembly 66 together. In this manner, the frame pieces 121, including the rings 128, and the fastener 88 may enable the battery cells 68 of the battery cell assembly 66 to be maintained in a defined position relative to one another, for example at a defined distance from the adjacent battery cells 68 created by the rings 128 and the passage 86. Progressive tightening of the fastener 88 may provide increased compression to the battery cells 68, as discussed herein.

In some embodiments, the end plates 90 disposed at either end of the battery cell assembly 66 may enable the battery cell assembly 66 to fit within the housing 50 and may help provide equal compression, or pressure, between the battery cells 68. The fastener 88, when turned, causes the end plates 90 to move toward one another and thereby compress the battery cells 68. Further, in some embodiments, the conductive sheet 132 and/or the foam sheet 130 may further help to provide equal compression, or pressure, between the battery cells 68 by providing structure between the battery cells 68. Equal compression between the battery cells 68 of the battery cell assembly 66 may enable increased performance of the battery cells 68, as compression may maintain closeness of the electrode stack within the battery cells 68, and thus, may enable increased performance of the battery module 28.

Further, the equalization assemblies 84 each associated with a respective battery cell 68 may enable an equal temperature between the battery cells 68 and may enable increased performance of the battery cells 68 and the battery module 28. The conductive sheet 132 may be made of a thermally conductive material, such as a metal, that may enable heat transfer to the conductive sheet 132 from the battery cell 68. In some embodiments, the conductive sheet 132 may be in contact with the associated battery cell 68 and/or the adjacent battery cell 68. The thermal pad 92 may be disposed adjacent to (e.g., in contact with) the base 54 of the battery module 28. The epoxy layer 96 may be disposed adjacent to the thermal pad 92, opposite the base 54. The epoxy layer 96 may act as an adhesive layer to maintain the position of the battery cell assembly 66. In some embodiments, the perimeter 122 of the frame pieces 121 along the bottom of the battery cells 68 may be disposed within the epoxy layer 96. In some embodiments, the lip portion 136 of the conductive sheet 132 may be disposed within the epoxy layer 96, such that the lip portion 136 of the conductive sheet 132 is in contact with the thermal pad 92.

Contact between the battery cell 68 and the conductive sheet 132 may enable heat transfer between the battery cell 68 and the conductive sheet 132. Contact between the lip portion 136 of the conductive sheet 132 and the thermal pad 92 may enable heat transfer between the conductive sheet 132 and the thermal pad 92. Contact between the thermal pad 92 and the base 54 may enable heat transfer between the thermal pad 92 and the base 54. Thus, heat from the battery cells 68 may be transferred from the battery cell 68 to the conductive sheet 132, from the conductive sheet 132 to the thermal pad 92, from the thermal pad 92 to the base 54, and from the base 54 to a conductive material outside of the battery module 28 or to the ambient air. Therefore, the equalization assemblies 84 may enable equalization of the pressure and/or temperature between the battery cells 68 within the battery module 28, and thus, enable an increase in the performance of the battery cells 68 and the battery module 28.

One or more of the disclosed embodiments, alone or on combination, may provide one or more technical effects including the manufacture of battery modules having a battery cell assembly including an equalization assembly associated with each battery cell of the battery module. The equalization assemblies may enable equalization of the temperature and/or the pressure between the battery cells of the battery module. The equalization assembly my include frame pieces that fit around the body of the battery cell and have an annular ring at the top. The annular rings of the frame pieces of each equalization assembly may couple together above the terminal surface of the battery cells to form a passage. A screw may be disposed within the passage to hold the frame pieces and the associated battery cells at a defined distance relative to each other. As such, the equalization assembly may enable an equalization of the pressure on each battery cell of the battery module. The battery cell assembly may include end plates disposed on each end of the battery cell assembly that may further help provide equal pressure on each of the battery cells of the battery module. The equalization assembly may include a conductive sheet disposed between the battery cells. The conductive sheet may have an L-shaped structure that may enable transfer of heat from the battery cell to the ambient environment outside of the battery module via heat transfer from the battery cell to the conductive sheet, from the conductive sheet to the thermal pad disposed below the battery cells and coupled to the conductive sheet, from the thermal pad to the conductive base of the battery module disposed below and coupled to the thermal pad, and from the conductive base to the ambient environment outside of the battery module. As such, the equalization assembly may enable equalization of the temperature between the battery cells of the battery module. The technical effects and technical problems in the specification are exemplary and are not limiting. It should be noted that the embodiments described in the specification may have other technical effects and can solve other technical problems.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. A lithium ion battery module, the lithium ion battery module comprising:
    a housing;
    an epoxy layer disposed within the housing; and
    a cell assembly disposed within the housing and comprising:
        a plurality of pouch battery cells; and
        a plurality of layers interleaved between the plurality of pouch battery cells, the plurality of layers comprising:
            a plurality of foam sheets configured to allow swelling of the plurality of pouch battery cells while maintaining a predetermined constant level of compression on the plurality of pouch battery cells; and
            a plurality of thermally conductive sheets, each thermally conductive sheet of the plurality of sheets having a lip portion disposed within the epoxy layer;
        the plurality of pouch battery cells being held within the cell assembly by a plurality of cell frames, each pouch battery cell having a corresponding cell frame, each cell frame comprising:
            a first frame piece positioned on and contacting a first side of a pouch battery cell of the plurality of battery cells and comprising a first ring;
            a second frame piece positioned on and contacting a second side of the pouch battery cell opposite the first side and comprising a second ring, the first and second rings being positioned above a terminal surface and between terminals of the pouch battery cell and being disposed directly adjacent to one another to form a portion of an annular passage; and
            a fastener of the cell assembly extending through the annular passage to physically couple the first frame piece and the second frame piece together and thereby form the cell frame.

2. The lithium ion battery module of claim 1, wherein the plurality of pouch battery cells of the cell assembly is arranged as a string in which each pouch battery cell is oriented parallel relative to an adjacent pouch battery cell.

3. The lithium ion battery module of claim 1, wherein the respective first and second rings of each cell frame are sized such that portions of the annular passage formed by each cell frame form the annular passage as a continuous structure, and wherein the fastener extends through all portions of the annular passage to hold the plurality of pouch battery cells together.

4. The lithium ion battery module of claim 1, wherein a foam sheet of the plurality of foam sheets is positioned in between a first pouch battery cell and a second pouch battery cell adjacent to the first pouch battery cell.

5. The lithium ion battery module of claim 4, wherein the cell assembly comprises first and second end plates disposed at opposite ends of the cell assembly in a position parallel relative to the plurality of pouch battery cells, wherein the first and second end plates each comprise an end plate ring configured to form end portions of the annular passage, and wherein the fastener is configured to be threaded into one of the end plate rings to provide progressively increasing amounts of compression to the cell assembly by causing the first and second end plates to move inwardly toward one another.

6. The lithium ion battery module of claim 5, wherein the first and second rings of the plurality of cell frames and the end plate rings of the first and second end plates defines a total length dimension for the annular passage, the total length dimension corresponding to a predetermined compression level for the cell assembly.

7. The lithium ion battery module of claim 4, wherein a thermally conductive sheet of the plurality of thermally conductive sheets is positioned in between the first pouch battery cell and the second pouch battery cell, wherein the plurality of thermally conductive sheets is configured to minimize temperature differences between the plurality of pouch battery cells.

8. The lithium ion battery module of claim 7, wherein each thermally conductive sheet comprises an L-shaped geometry having a body portion arranged parallel relative to the plurality of battery cells, wherein the lip portion is arranged transverse relative to the plurality of battery cells, and wherein the lip portion is oriented parallel relative to a base of the housing of the battery module.

9. The lithium ion battery module of claim 8, comprising a thermal pad positioned between the lip portion and the base, wherein the thermal pad is configured to conduct heat away from the cell assembly and toward the base of the housing.

10. The lithium ion battery module of claim 1, wherein the first frame piece and the second frame piece each comprise a rigid perimeter and a hollow interior region, wherein the perimeters of the first frame piece and the second frame piece are coupled around a perimeter of the pouch battery cell, wherein a body of the pouch battery cell is disposed within the hollow interior regions of the first frame piece and the second frame piece.

11. The lithium ion battery module of claim 1, wherein a packaging of the pouch battery cell comprises a ridge disposed between the terminal surface and a body, wherein the ridge is configured to separate the terminal surface from the body of the pouch battery cell to allow one or more terminals of the pouch battery cell to be accessible outside of the first frame piece and the second frame piece.

12. The lithium ion battery module of claim 1, further including:
 terminals to connect to a vehicle; and
 the plurality of pouch battery cells being electrically connected in multiple groups and being electrically connected to the terminals of the lithium ion battery module, the lithium ion battery module having a capacity and discharge rate sufficient to act as a starter battery for the vehicle.

* * * * *

UNITED STATES PATENT AND TRADEMARK OFFICE
CERTIFICATE OF CORRECTION

PATENT NO. : 11,394,072 B2
APPLICATION NO. : 16/304628
DATED : July 19, 2022
INVENTOR(S) : Jansen et al.

Page 1 of 2

It is certified that error appears in the above-identified patent and that said Letters Patent is hereby corrected as shown below:

On the Title Page

Item (56), under "OTHER PUBLICATIONS", in Column 2, Line 2, delete "2017. 23 pages." and insert -- 2017, 23 pages. --, therefor.

In the Specification

In Column 1, Line 45, delete "systems (FHEVs)" and insert -- electric vehicles (FHEVs) --, therefor.

In Column 1, Line 49, delete "systems (MHEVs)" and insert -- electric vehicles (MHEVs) --, therefor.

In Column 1, Line 54, delete "assist," and insert -- assistance, --, therefor.

In Column 1, Line 61, delete "assist" and insert -- assistance --, therefor.

In Column 3, Line 46, delete "DRAWINGS" and insert -- BRIEF DESCRIPTION OF DRAWINGS --, therefor.

In Column 4, Line 49, delete "manufactures" and insert -- manufacturers --, therefor.

In Column 4, Line 52, delete "manufactures" and insert -- manufacturers --, therefor.

In Column 7, Line 14, delete "one or" and insert -- one or more --, therefor.

In Column 7, Line 30, delete "lead-acid module 30" and insert -- lead-acid battery module 30 --, therefor.

In Column 8, Line 28, delete "if the" and insert -- of the --, therefor.

In Column 8, Line 48, delete "and or" and insert -- and/or --, therefor.

Signed and Sealed this
Twenty-fourth Day of September, 2024

Katherine Kelly Vidal
*Director of the United States Patent and Trademark Office*

CERTIFICATE OF CORRECTION (continued)
U.S. Pat. No. 11,394,072 B2

In Column 9, Lines 40-41, delete "battery cell assembly 68" and insert -- battery cell assembly 66 --, therefor.

In Column 9, Line 55, delete "battery cell assembly 68" and insert -- battery cell assembly 66 --, therefor.

In Column 11, Line 37, delete "body 120" and insert -- body 102 --, therefor.

In Column 14, Lines 54-55, delete "on combination," and insert -- in combination, --, therefor.

In Column 14, Line 61, delete "my" and insert -- may --, therefor.

In the Claims

In Column 16, Line 48, in Claim 8, delete "transverse" and insert -- transversely --, therefor.